United States Patent
Ooyama et al.

(10) Patent No.: US 6,804,430 B2
(45) Date of Patent: Oct. 12, 2004

(54) OPTICAL MULTIPLEXER/DEMULTIPLEXER

(75) Inventors: Isao Ooyama, Tokyo (JP); Hiroyuki Koshi, Tokyo (JP); Takuya Komatsu, Tokyo (JP); Kazuhisa Kashihara, Tokyo (JP)

(73) Assignee: The Furukawa Electric Co., LTD, Tokyo (JP)

( * ) Notice: Subject to any disclaimer, the term of this patent is extended or adjusted under 35 U.S.C. 154(b) by 217 days.

(21) Appl. No.: 10/156,868

(22) Filed: May 30, 2002

(65) Prior Publication Data

US 2003/0002786 A1 Jan. 2, 2003

(30) Foreign Application Priority Data

May 30, 2001 (JP) .......................................... 2001-162946
May 21, 2002 (JP) .......................................... 2002-146368

(51) Int. Cl.[7] .................................................. G02B 6/28
(52) U.S. Cl. ................................ 385/24; 385/27; 398/48
(58) Field of Search ............................... 385/27, 50, 24, 385/15, 42; 398/48, 68

(56) References Cited

U.S. PATENT DOCUMENTS

| | | | | |
|---|---|---|---|---|
| 6,295,397 | B1 * | 9/2001 | Augustsson ................ | 385/24 |
| 6,684,006 | B2 * | 1/2004 | Zhao ......................... | 385/24 |
| 6,724,954 | B2 * | 4/2004 | Arai et al. .................. | 385/24 |
| 6,724,957 | B2 * | 4/2004 | Saida et al. ................ | 385/27 |
| 6,728,447 | B2 * | 4/2004 | Koshi et al. ................ | 385/42 |
| 6,735,358 | B2 * | 5/2004 | Kitoh et al. ................ | 385/24 |
| 6,754,411 | B2 * | 6/2004 | Ahmadvand et al. ........ | 385/24 |
| 2002/0015561 | A1 * | 2/2002 | Kawashima et al. ......... | 385/42 |
| 2002/0106147 | A1 * | 8/2002 | Kitoh et al. ................ | 385/24 |
| 2002/0176660 | A1 * | 11/2002 | Saito et al. ................. | 385/24 |
| 2003/0007734 | A1 * | 1/2003 | Koshi et al. ................ | 385/42 |
| 2004/0022493 | A1 * | 2/2004 | Takiguchi et al. ........... | 385/42 |
| 2004/0067022 | A1 * | 4/2004 | Chen et al. ................. | 385/42 |

FOREIGN PATENT DOCUMENTS

| | | |
|---|---|---|
| JP | 61-80109 | 4/1986 |
| JP | 2-157711 | 6/1990 |
| JP | 2002-372639 A | * 12/2002 |

OTHER PUBLICATIONS

H. Toba et al., NTT Electrical Communications Laboratories, 5GHz–Spaced, Eight Channel, Guided–Wave Tunable Muli/Demultiplexer For Optical FDM Transmission Systems, Electronics Letters, Jul. 16, 1987, vol. 23 No. 15, pp. 788–789.

(List continued on next page.)

*Primary Examiner*—Jared J. Fureman
(74) *Attorney, Agent, or Firm*—Oblon, Spivak, McClelland, Maier & Neustadt, P.C.

(57) ABSTRACT

An optical multiplexer/demultiplexer has a plurality of Mach-Zehnder optical interferometer multiplexing/demultiplexing circuits connected in plural stages, at least one of the plurality of Mach-Zehnder optical interferometer multiplexing/demultiplexing circuits including a first optical waveguide, a second optical waveguide disposed along the first optical waveguide, a first directional coupling portion that connects a first part of the first optical waveguide to a first part of the second optical waveguide, and a second directional coupling portion that connects a second part of the first optical waveguide to a second part of the second optical waveguide. A relationship among a coupling portion length $L_R$ of at least one of the first and second directional coupling portions, a complete coupling length $L_C$ of at least one of the first and second directional coupling portions and a lead portion coupling length $L_e$ of at least one of the first and second directional coupling portions, is substantially:

$$\frac{\pi}{2} \times \frac{L_e + L_R}{L_C} = \frac{\pi}{4}.$$

18 Claims, 9 Drawing Sheets

OTHER PUBLICATIONS

N. Takato et al., NTT Electrical Communications Laboratories, Guided–wave Multi/demultiplexer for Optical FDM Transmission, ECOC, 1986, pp. 443–446, no month available.

K. Inoue et al., A Four–Channel Optical Waveguide Multi/Demultiplexer for 5–GHz Spaced Optical FDM Transmission, 1988 IEEE, Feb. 1988, pp. 339–345.

N. Takato et al., Silica–Based Single–Mode Waveguides on Silicon and their Application to Guided–Wave Optical Interferometers, Journal of Lightwave Technology, vol. 6, No. 6, Jun. 1988, pp. 1003–1010.

M. Kawachi, NTT Opto–Electronics Laboratories Tokai, Silica waveguides on silicon and their application to integrated–optic components, Optical and Quantum Electronics 22 (1990), pp. 391–416, no month available.

B.H. Verbeek et al., Integrated Four–Channel Mach–Zehnder Multi/Demultiplexer Fabricated with Phosphorous Doped $SiO_2$ Waveguides on Si, IEEEJ. Lightwave Technol., 6, No. 6, pp. 1011–1015, 1988, no month available.

* cited by examiner

OPTICAL MULTIPLEXER/DEMULTIPLEXER

BACKGROUND OF THE INVENTION

Very recently, traffics in the Internet are rapidly increased. Under such circumstances, expansions of communication network capacities are strongly required. In connection with these strong demands, wavelength division multiplexing (WDM) transmission techniques have been positively developed and popularized. Since the wavelength division multiplexing transmission techniques correspond to techniques capable of multiplexing a plurality of optical signals having different wavelengths with each other to transmit the multiplexed-optical signal to a single optical fiber, a transmission capacity can be expanded by a total number of multiplexed wavelengths.

To realize a wavelength division multiplexing transmission system, an optical device such as an optical multiplexer/demultiplexer is required. An optical multiplexer/demultiplexer corresponds to such an apparatus for multiplexing, for example, lights having a plurality of wavelengths, and for demultiplexing (separating) multiplexed light to a plurality of light having various wavelengths.

For instance, in such a wavelength division multiplexing transmission system, an optical multiplexer/demultiplexer provided for executing the multiplexing operation multiplexes lights having plural wavelengths with each other. The wavelength-multiplexed light which is formed by the multiplexing operation is transmitted to an optical fiber. Also, for instance, such an optical multiplexer/demultiplexer provided for the demultiplexing operation demultiplexes the wavelength-multiplexed light transmitted via the optical fiber. The demultiplexed light every wavelength is derived.

As one example of such an optical multiplexer/demultiplexer, an optical waveguide type optical multiplexer/demultiplexer may be employed. This optical waveguide type optical multiplexer/demultiplexer is manufactured by that an optical waveguide circuit is formed on a substrate. Since high-precision pattern techniques which have been developed in semiconductor fields may be applied to such an optical waveguide type optical multiplexer/demultiplexer, superior designing characteristics thereof may be obtained.

As this optical waveguide type optical multiplexer/demultiplexer, for example, a Mach-Zehnder interferometer (MZI) type optical multiplexer/demultiplexer has been practically utilized. FIG. 9 indicates a structural example of a circuit (namely, optical multiplexing/demultiplexing circuit) which constitutes such a Mach-Zehnder interferometer type optical multiplexer/demultiplexer.

The optical multiplexing/demultiplexing circuit 8 shown in FIG. 9 includes a first optical waveguide 3, and a second optical waveguide 4 arranged side by side with respect to the first optical waveguide 3. Also, this optical multiplexing/demultiplexing circuit 8 owns a first directional coupling portion 1 formed in such a manner that the first optical waveguide 3 is provided in proximity to the second optical waveguide 4. Also, the optical multiplexing/demultiplexing circuit 8 owns a second directional coupling portion 2 formed in such a manner that the first optical waveguide 3 is provided in proximity to the second optical waveguide 4 at a position via an interval with respect to the first directional coupling portion 1 along a longitudinal direction of the first and second optical waveguides. Both the first optical waveguide 3 and the second optical waveguide 4, which are sandwiched between the adjoining (adjacent) directional coupling portions 1 and 2, own different lengths from each other.

The optical multiplexing/demultiplexing circuit 8 shown in FIG. 9 corresponds to such an optical multiplexing/demultiplexing circuit which may multiplex lights and/or demultiplex light having different wavelengths by properly setting a product (n×ΔL), while this product is defined by multiplying a difference "ΔL" between the length of the first optical waveguide 3 and the length of the second optical waveguide 4, which are sandwiched between both the first directional coupling portion 1 and the second directional coupling portion 2, by diffractive indexes "n" of both the first and second optical waveguides 3 and 4.

It should be noted that in the Mach-Zehnder interferometer type optical multiplexing/demultiplexing circuit 8, generally speaking, the below-mentioned path of light is called as a "through transmission path." In other words, such a through transmission path corresponds to a path of light which is entered from a light incident side 13 of the first optical waveguide 3 and then is outputted from a light projection side 23 of this first optical waveguide 3, or another path of light which is entered from a light incident side 14 of the second optical waveguide 4 and then is outputted from a light projection side 24 of this second optical waveguide 4. In this specification, a wavelength of such a light designed in such a manner that this light is transmitted via this through transmission path will be referred to as a "through transmission wavelength." In FIG. 9, a wavelength "λ1" corresponds to this through transmission wavelength.

Also, in the Mach-Zehnder interferometer type optical multiplexing/demultiplexing circuit 8, generally speaking, the below-mentioned path of light is called as a "cross transmission path." In other word, such a cross transmission path corresponds to a path of light which is entered from the light incident side 13 of the first optical waveguide 3 and then is outputted from the light projection side 24 of the second optical waveguide 4, or another path of light which is entered from the light incident side 14 of the second optical waveguide 4 and then is outputted from the light projection side 23 of the first optical waveguide 3. In this specification, a wavelength of such a light designed in such a manner that the light is transmitted via this cross transmission path will be referred to as a "cross transmission wavelength." In FIG. 9, a wavelength "λ2" corresponds to this cross transmission wavelength.

Also, for example, as shown in FIG. 10, such an optical multiplexer/demultiplexer has been proposed which is formed by connecting Mach-Zehnder interferometer type optical multiplexing/demultiplexing circuits 8 (8A to 8G) to each other in a tree shape. This optical multiplexer/demultiplexer contains plural stages of optical multiplexing/demultiplexing circuit 8, while plural stages (three stages in this example) are defined from a first stage up to an M-th stage (symbol "M" being integer larger than, or equal to 2, namely, 3 is selected in this example). That is, the plural stages of the optical multiplexing/demultiplexing circuits 8 are formed by arranging one, or plural sets of optical multiplexing/demultiplexing circuits 8 (8A to 8G) side by side.

In the optical multiplexer/demultiplexer shown in FIG. 10, for instance, a first stage of plural optical multiplexing/demultiplexing circuits 8 (8A, 8B, 8C, 8D) multiplex light entered from a corresponding first optical waveguide 3 and light entered from a corresponding second optical waveguide 4 respectively, and then, output the multiplexed light from either the first optical waveguide 3 or the second optical waveguide 4 respectively. A second stage of an optical multiplexing/demultiplexing circuit 8(8E) furthermore multiplexes the optical outputs from the first stage of one pair of optical multiplexing/demultiplexing circuits 8 (8A, 8B). The second stage of this optical multiplexing/demultiplexing circuit 8 (8F) furthermore multiplexes the optical outputs from the first stage of one pair of optical multiplexing/demultiplexing circuits 8 (8C, 8D).

Furthermore, a third stage of optical multiplexing/demultiplexing circuit 8 (8G) multiplexes the optical outputs from the second stage of one pair of optical multiplexing/demultiplexing circuits 8 (8E, 8F). As previously explained, in the optical multiplexer/demultiplexer shown in FIG. 10, the post stage of the optical multiplexing/demultiplexing circuits 8 furthermore multiplex the optical outputs from the pre-stage of one pair of the optical multiplexing/demultiplexing circuits 8.

In the optical multiplexer/demultiplexer shown in FIG. 10, the first stage of the optical multiplexing/demultiplexing circuit 8A multiplexes light having a wavelength of "$\lambda_a$" and light having a wavelength of "$\lambda_b$", and also the first stage of the optical multiplexing/demultiplexing circuit 8B multiplexes light having wavelength of "$\lambda_c$" and light having a wavelength of "$\lambda_d$." Also, the first stage of the optical multiplexing/demultiplexing circuit 8C multiplexes light having a wavelength of "$\lambda_e$" and light having a wavelength of "$\lambda_f$", and also the first stage of the optical multiplexing/demultiplexing circuit 8D multiplexes light having a wavelength of "$\lambda_g$" and light having a wavelength of "$\lambda_h$."

Further, the second stage of the optical multiplexing/demultiplexing circuit 8E multiplexes the lights having the wavelengths of "$\lambda_a$", "$\lambda_b$", "$\lambda_c$", "$\lambda_d$" with each other, and also, the second stage of the optical multiplexing/demultiplexing circuit 8F multiplexes the lights having the wavelengths of "$\lambda_e$", "$\lambda_f$", "$\lambda_g$", "$\lambda_h$" with each other. In addition, the third stage of the optical multiplexing/demultiplexing circuit 8G multiplexes the lights having the wavelengths of "$\lambda_a$", "$\lambda_b$", "$\lambda_c$", "$\lambda_d$", "$\lambda_e$", "$\lambda_f$", "$\lambda_g$", and "$\lambda_h$" with each other, and then the multiplexed light is outputted from the second optical waveguide 4 of the optical multiplexing/demultiplexing circuit 8.

It should be noted that the optical multiplexer/demultiplexer indicated in FIG. 10 owns a reciprocity characteristic of an optical circuit. As a result, contrary to FIG. 10, in such a case that the multiplexed light having the wavelengths of "$\lambda_a$", "$\lambda_b$", "$\lambda_c$", "$\lambda_d$", "$\lambda_e$", "$\lambda_f$", "$\lambda_g$", and "$\lambda_h$" is inputted from the second optical waveguide 4 of the optical multiplexing/demultiplexing circuit 8 (8G), this multiplexed light is demultiplexed by these optical multiplexing/demultiplexing circuits 8 (8A to 8G) to produce a plurality of light having the respective wavelengths. Then, a plurality of demultiplexed lights are outputted from the first stage of the plural optical multiplexing/demultiplexing circuits 8 (8A, 8B, 8C, 8D) respectively.

SUMMARY OF THE INVENTION

An optical multiplexer/demultiplexer, according to the present invention, is featured by comprising:
optical multiplexing/demultiplexing circuits of Mach-Zehnder optical interferometers which are connected in plural stages; wherein:
the optical multiplexing/demultiplexing circuit of one Mach-Zehnder optical interferometer is comprised of:
a first optical waveguide;
a second optical waveguide arranged side by side with respect to the first optical waveguide; and
a first directional coupling portion formed in such a manner that the first optical waveguide is provided in proximity to the second optical waveguide; and a second directional coupling portion formed in such a manner that the first optical waveguide is provided in proximity to the second optical waveguide at a position with an interval with respect to the first directional coupling portion along a longitudinal direction of the first and second optical waveguides;
both the first optical waveguide and the second optical waveguide, which are sandwiched between both the first directional coupling portion and the second directional coupling portion, own different lengths from each other; and wherein:
in each of the plural stages of the optical multiplexing/demultiplexing circuits, in such a case that either a wavelength of such light which is inputted from a light incident side of the first optical waveguide and then is outputted from a light projection side of the second optical waveguide, or another wavelength of such light which is inputted from a light incident side of the second optical waveguide and then is outputted from a light projection side of the first optical waveguide is defined as a cross transmission wavelength; and
in such a case that either a wavelength of such light which is inputted from the light incident side of the first optical waveguide and then is outputted from the light projection side of the first optical waveguide, or another wavelength of such light which is inputted from the light incident side of the second optical waveguide and then is outputted form the light projection side of the second optical waveguide is defined as a through transmission wavelength;
an averaged wavelength of the cross transmission wavelengths is made longer than an averaged wavelength of the through transmission wavelengths in the respective stages of the optical multiplexing/demultiplexing circuits.

BRIEF DESCRIPTION OF THE DRAWINGS

Exemplary embodiments of the invention will now be described in conjunction with drawings, in which.

DETAILED DESCRIPTION

Very recently, strong demands as to lower transmission losses are made with respect to optical multiplexers/demultiplexers which are applied to, for example, wavelength division multiplexing transmissions. However, in the optical multiplexer/demultiplexer in which plural stages of the conventional Mach-Zehnder interferometer type optical multiplexing/demultiplexing circuits 8 are connected to each other, while involving the proposed optical multiplexer/demultiplexer shown in FIG. 10, there is no clear structural requirement when the wavelengths of the lights entered from the respective optical input portions thereof are determined. As a result, such an optical multiplexer/demultiplexer in which the plural stages of the conventional Mach-Zehnder interferometer type optical multiplexing/demultiplexing circuits 8 are connected to each other could not sufficiently satisfy the above-explained requirement as to the lower transmission losses.

Also, another demand as to lower manufacturing cost is made with respect to the above-described optical multiplexer/demultiplexer. To realize such a lower-cost optical multiplexer/demultiplexer, a length of a chip is desirably shortened.

Figure 3:
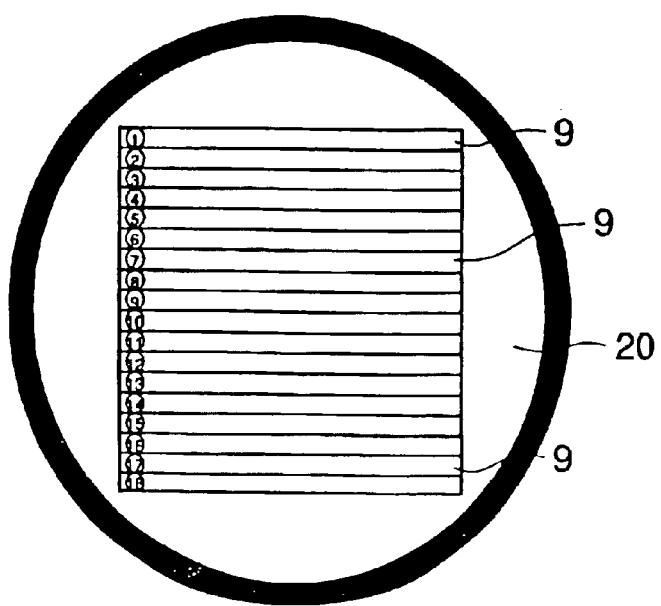
FIG. 3 is an explanatory view for indicating an arranging structure in the case that the chip of the optical multiplexer/demultiplexer of this embodiment is formed on a 4-inch wafer.
Figure 11:
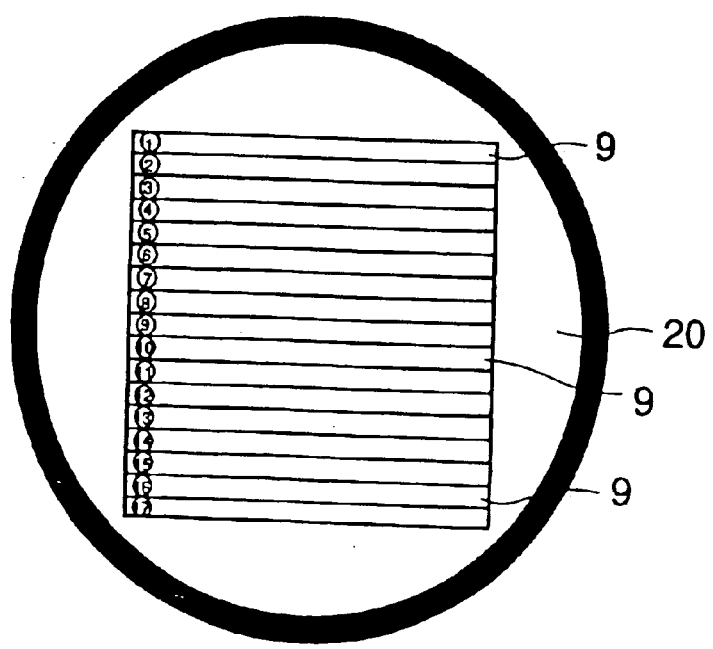
FIG. 11 is an explanatory view for indicating the arranging structure in the case that such a circuit arrangement is formed on a 4-inch wafer, in which plural stages of the conventional optical multiplexing/demultiplexing circuits of the Mach-Zehnder interferometers are connected to each other.

For example, in the case that such a chip whose chip length is 63 mm is arranged on a 4-inch wafer, if margin is secured in a manufacturing process, then only 17 pieces of chips 9 are arrayed on a single wafer 20, as illustrated in FIG. 11. In contract to this case, as represented in FIG. 3, for example, in such a case that a chip length is selected to 62 mm, 18 pieces of chips 9 may be arrayed on a single wafer 20 in one column. It should be understood that reference numerals 1, 2, 3, . . . , indicate arranging numbers of the chips in FIGS. 3 and 11.

As explained above, if a total number of chips 9 which can be arrayed on a single wafer 20 can be increased, then manufacturing cost can be accordingly reduced. As a consequence, chip lengths of optical multiplexers/demultiplexers are preferably made shorter.

Under such a circumstance, Inventors of the present invention have proposed, for instance, various structures of optical multiplexers/demultiplexers as described in the following embodiments, while the Inventors have made various considerations in order to propose such low-cost optical multiplexers/demultiplexers with low transmission losses, the chip lengths of which can be shortened.

Figure 1:
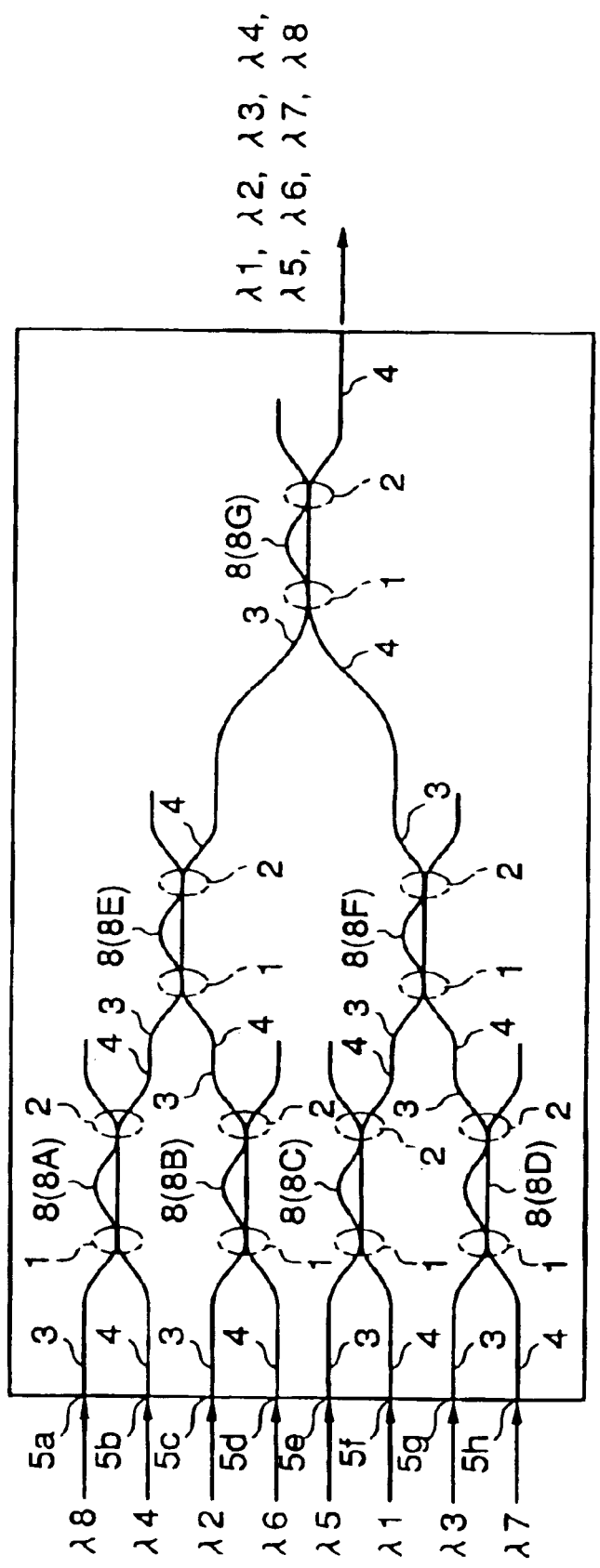
FIG. 1 is an essential-part structural view for schematically indicating an optical multiplexer/demultiplexer according to an embodiment of the present invention.

Referring now to drawings, various embodiment modes of the present invention will be described in detail. It should be understood that in descriptions of the below-mentioned embodiments, the same reference numerals shown in the prior art will be employed as those for denoting the same, or similar structural elements, and explanations thereof are omitted, or will be simply made. In FIG. 1, an essential-part structural view of an optical multiplexer/demultiplexer according to one embodiment of the present invention is indicated.

The optical multiplexer/demultiplexer of one preferred embodiment is constructed in such a manner that 7 sets of optical multiplexing/demultiplexing circuits 8 (8A to 8G) are connected to each other in three stages in a tree-shaped form. The optical multiplexer/demultiplexer of this embodiment is so arranged by that a plurality of lights having wavelengths of "λ1" to "λ8" shown in a table 1 are inputted to optical input portions 5a to 5h indicated in this drawing.

TABLE 1

| input portion | wavelength (nm) | symbol | first stage of optical multiplexing/demultiplexing circuit | | symbol | second stage of optical multiplexing/demultiplexing circuit | | symbol | third stage of optical multiplexing/demultiplexing circuit | |
|---|---|---|---|---|---|---|---|---|---|---|
| | | | DC setting wavelength of $\eta = 0.5$ | DC couplings portion length ($\mu$m) of $\eta = 0.5$ | | DC setting wavelength of $\eta = 0.5$ | DC couplings portion length ($\mu$m) of $\eta = 0.5$ | | DC setting wavelength of $\eta = 0.5$ | DC couplings portion length ($\mu$m) of $\eta = 0.5$ |
| 5a | 1502.7 | λ8 | 8A | λ8 | 337.5 | 8E | $\frac{2 \cdot \lambda 4 \cdot \lambda 8}{\lambda 4 + \lambda 8}$ | 346.8 | 8G | $\frac{4 \cdot \lambda 2 \cdot \lambda 4 \cdot \lambda 6 \cdot \lambda 8}{\lambda 4 \cdot \lambda 6 \cdot \lambda 8 \cdot \lambda 2 \cdot \lambda 6 \cdot \lambda 8 \cdot \lambda 2 \cdot \lambda 4 \cdot \lambda 6 \cdot \lambda 2 \cdot \lambda 4 \cdot \lambda 6}$ | 351.5 |
| 5b | 1473.2 | λ4 | | | | | | | | | |
| 5c | 1458.8 | λ2 | 8B | λ6 | 346.8 | | | | | | |
| 5d | 1487.8 | λ6 | | | | | | | | | |

TABLE 1-continued

| | | first stage of optical multiplexing/demultiplexing circuit | | | second stage of optical multiplexing/demultiplexing circuit | | | third stage of optical multiplexing/demultiplexing circuit | |
|---|---|---|---|---|---|---|---|---|---|
| input portion | wavelength (nm) | sym-bol | DC setting wavelength of η = 0.5 | DC couplings portion length (μm) of η = 0.5 | sym-bol | DC setting wavelength of η = 0.5 | DC couplings portion length (μm) of η = 0.5 | sym-bol | DC setting wavelength of η = 0.5 | DC couplings portion length (μm) of η = 0.5 |
| 5e | 1480.5 λ5 | 8C | λ5 | 351.4 | 8F | $\frac{2\cdot\lambda3\cdot\lambda7}{\lambda3+\lambda7}$ | 351.5 | | | |
| 5f | 1451.8 λ1 | | | | | | | | | |
| 5g | 1466.0 λ3 | 8D | λ7 | 342.2 | | | | | | |
| 5h | 1495.2 λ7 | | | | | | | | | |

In this table 1, symbol "DC" indicates directional coupling portions 1 and 2. As represented in the table 1, in the optical multiplexer/demultiplexer of the embodiment, an averaged wavelength of cross transmission wavelengths is made longer than an average wavelength of through transmission wavelengths in each stage of the optical multiplexing/demultiplexing circuits 8 (8A to 8G).

Also, in this embodiment, as represented in the table 1, the directional coupling portions 1 and 2 of each stage of the optical multiplexing/demultiplexing circuits 8 (8A to 8G) are set in such a manner that a coupling efficiency with respect to the averaged wavelength of the cross transmission wavelengths corresponding to each stage of the optical multiplexing/demultiplexing circuits 8 (8A to 8G) becomes nearly equal to 50% (η=0.5). It should be noted that a definition the coupling efficiency "η" will be explained later.

Also, it should be noted that any of an averaged wavelength of through transmission wavelengths and also an averaged wavelength of cross transmission wavelengths, which are described in this specification, indicates a wavelength-converted value of an averaged frequency. This value may be calculated in such a manner that the respective wavelengths are converted into frequencies, and then, a light velocity "C" is divided by an averaged value of these frequencies.

For instance, in the case that the through transmission wavelengths are selected to be "λ1" and "λ3", an averaged wavelength thereof becomes such a value shown in formula (1). Also, in the case that the cross transmission wavelengths are selected to be "λ2" and "λ4", an averaged wavelength thereof becomes such a value shown in formula (2).

$$\frac{C}{\left\{\frac{C}{2}\left(\frac{1}{\lambda1}+\frac{1}{\lambda3}\right)\right\}} = \frac{2}{\left(\frac{\lambda3+\lambda1}{\lambda1\cdot\lambda3}\right)} = \frac{2\cdot\lambda1\cdot\lambda3}{\lambda1+\lambda3} \quad \text{(Formula 1)}$$

$$\frac{C}{\left\{\frac{C}{2}\left(\frac{1}{\lambda2}+\frac{1}{\lambda4}\right)\right\}} = \frac{2}{\left(\frac{\lambda4+\lambda2}{\lambda2\cdot\lambda4}\right)} = \frac{2\cdot\lambda2\cdot\lambda4}{\lambda2+\lambda4} \quad \text{(Formula 2)}$$

Figure 9:
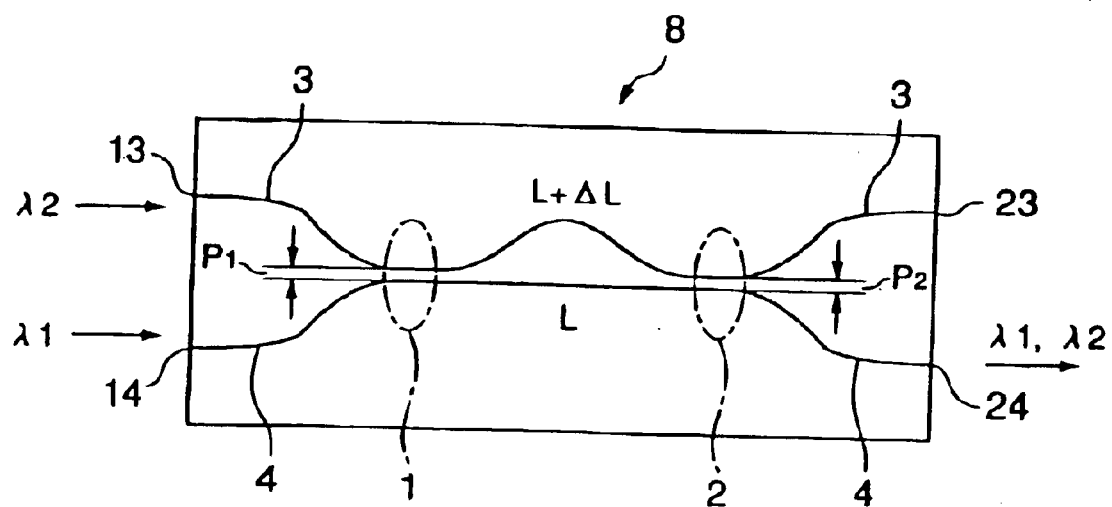
FIG. 9 is an explanatory view for indicating an optical multiplexing/demultiplexing circuit of a Mach-Zehnder optical interferometer.

Also, as indicated in FIG. 9, in the case that the through transmission wavelength of the optical multiplexing/demultiplexing circuit is equal to 1 wavelength, an averaged wavelength thereof is also equal to this value, and in the case that the cross transmission wavelength of the optical multiplexing/demultiplexing circuit is equal to 1 wavelength, an averaged wavelength thereof is also equal to this value. For instance, in FIG. 9, the averaged wavelength of the through transmission wavelengths is "λ1", and the averaged wavelength of the cross transmission wavelengths is "λ2."

On the other hand, for instance, in the Mach-Zehnder interferometer type optical multiplexing/demultiplexing circuit 8 shown in FIG. 9, it is so assumed that transmittance of light which passes the through transmission path is "Tth", and transmittance of light which passes the cross transmission path is "Tcr." As a result, the respective transmittance "Tth" and "Tcr" may be expressed by employing the above-described value "ΔL" and "n" in accordance with the below-mentioned formula (3) and (4):

$$T_{th}=1-\sin^2(2\sin^{-1}\eta)\cos^2(\pi\cdot n\cdot\Delta L/\lambda) \quad \text{(Formula 3)}$$

$$T_{cr}=\sin^2(2\sin^{-1}\eta)\cos^2(\pi\cdot n\cdot\Delta L/\lambda) \quad \text{(Formula 4)}$$

In these formulae, symbol "η" represents such a coupling efficiency of both the first and second directional coupling portions 1 and 2 by using any number defined from 0 to 1. When the coupling efficiency is equal to 100%, it is so assumed that η=1. Thus, when the coupling efficiency is equal to 50%, it is so assumed that η=0.5. It should be understood that the coupling efficiencies of the first and second coupling directional portions are nearly equal to each other.

In this case, assuming now that the through transmission wavelength is selected to be "λ1", and the cross transmission wavelength is selected to be "λ2", in order that the light having the wavelength of "λ1" is multiplexed with the light having the wavelength of "λ2" under conditions of low transmission loss and low crosstalk, the below-mentioned formula (5) to formula (7) should be satisfied:

$$\eta=0.5 \quad \text{(Formula 5)}$$

$$n\cdot\Delta L=\lambda1*(N\pm0.5) \quad \text{(Formula 6)}$$

$$n\cdot\Delta L=\lambda2*N \quad \text{(Formula 7)}$$

It should be noted in these formulae that a plurality of ΔL may be determined with respect to different integers "N."

In order to realize a low transmission loss of an optical multiplexer/demultiplexer, the Inventors of the present invention calculated both a transmission loss (attenuation) of the light having the wavelength of "λ1" and a transmission loss (attenuation) of the light having the wavelength "λ2" in the optical multiplexing/demultiplexing circuit 8, while changing the coupling efficiencies of the first and second directional coupling portions 1 and 2 with respect to the wavelength "λ1" and "λ2" in this optical multiplexing/demultiplexing circuit 8 shown in FIG. 9.

Figure 4A:
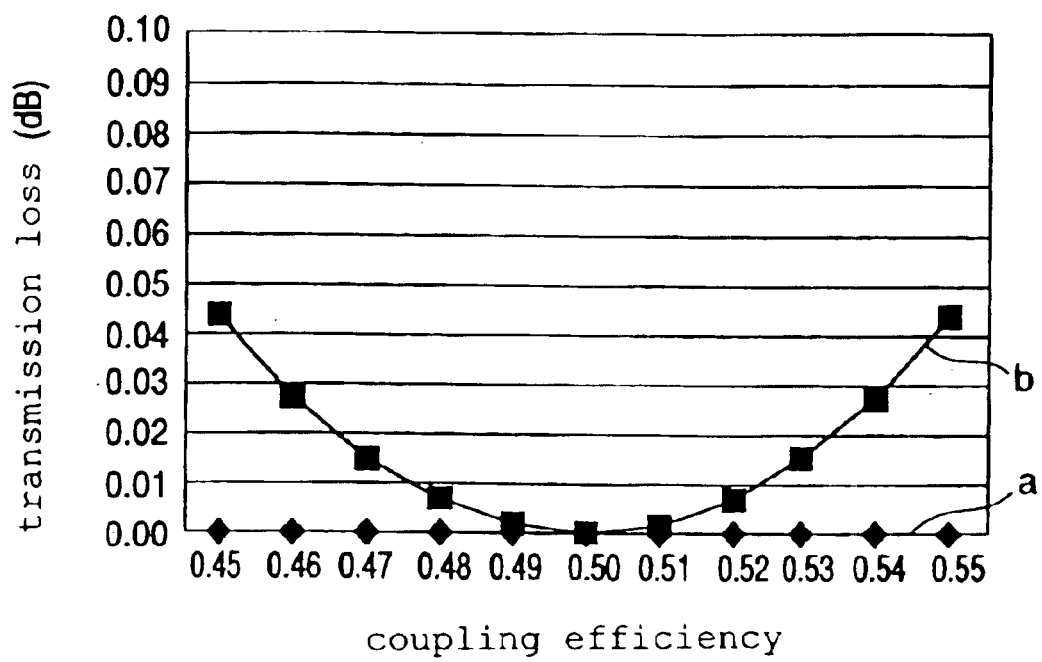
FIG. 4A is a graph for graphically representing a transmission loss of the optical multiplexing/demultiplexing circuit in such a case that coupling efficiencies of a through transmission wavelength and a cross transmission wavelength are changed.

As a result, the calculation results shown in FIG. 4A were obtained. In FIG. 4A, an abscissa shows the coupling efficiency by using a value of "η", a characteristic line "a" shows the transmission loss of the light having the wavelength "λ1" corresponding to the through transmission wavelength, and another characteristic line "b" denotes the transmission loss of the light having the wavelength "λ2" corresponding to the cross transmission wavelength.

As represented in the characteristic line "a" of FIG. 4A, even when the coupling efficiencies of the fist and second directional coupling portions 1 and 2 are changed from 45% to 55% (namely, even when "η" value is changed from 0.45 to 0.55), there is substantially no change in the transmission loss of the light having the wavelength of "λ1" corresponding to the through transmission wavelength. To the contrary, the following fact could be revealed. That is, as indicated by the characteristic line "b" of FIG. 4A, the transmission loss of the light having the wavelength "λ2" corresponding to the cross transmission wavelength is largely increased while the value of the coupling efficiencies of both the directional coupling portions 1 and 2 are separated far from 50% (while value "η" is separated far from 0.5).

As a consequence, the Inventors could consider that the transmission losses of the light having the respective wavelengths, which are propagated through the optical multiplexing/demultiplexing circuit 8, could be lowered by employing such a manner that the coupling efficiencies of the directional coupling portions 1 and 2 with respect to the cross transmission wavelengths could be set to 50% as being permitted as possible in the Mach-Zehnder interferometer type optical multiplexing/demultiplexing circuit 8.

Figure 10:
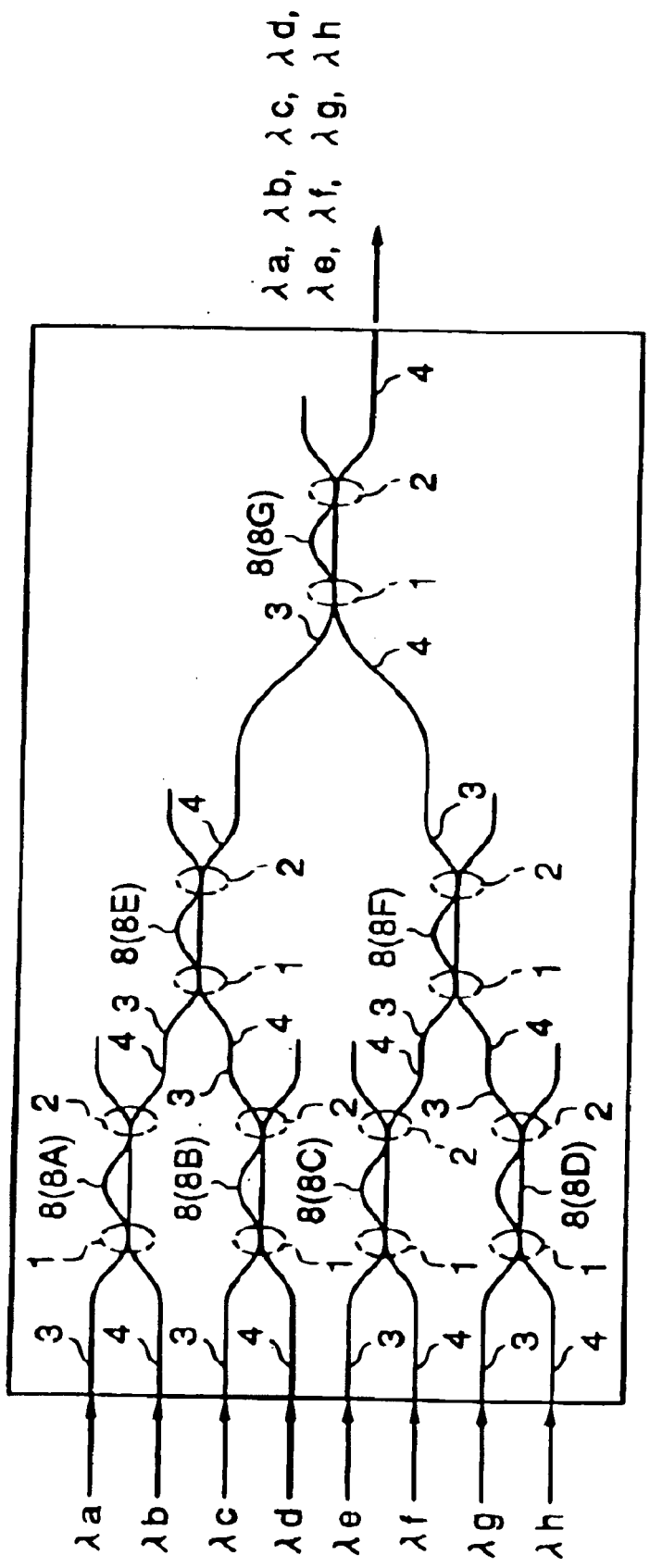
FIG. 10 is an explanatory diagram for representing an example of circuit arrangements in which plural stages of optical multiplexing/demultiplexing circuits of the Mach-Zehnder optical interferometers are connected to each other.

Also, for example, in such an optical multiplexer/demultiplexer in which plural stages of the Mach-Zehnder interferometer type optical multiplexing/demultiplexing circuit 8 as shown in FIG. 10 are connected to each other, plural sets of through transmission wavelengths and plural sets of cross transmission wavelengths are provided in the optical multiplexing/demultiplexing circuit 8 at stages after the second stage.

As a consequence, the Inventors have investigated a transmission loss characteristic of the optical multiplexing/demultiplexing circuit 8 in such a case that the plural sets of through transmission wavelengths and the plural sets of cross transmission wavelengths are propagated through this optical multiplexing/demultiplexing circuit 8 in the following manner. This investigation was carried out as to such an optical multiplexer/demultiplexer in which the Mach-Zehnder interferometer type optical multiplexing/demultiplexing circuit 8 (8A to 8C) were connected to each other in two stages as shown in FIG. 12.

Figure 12:
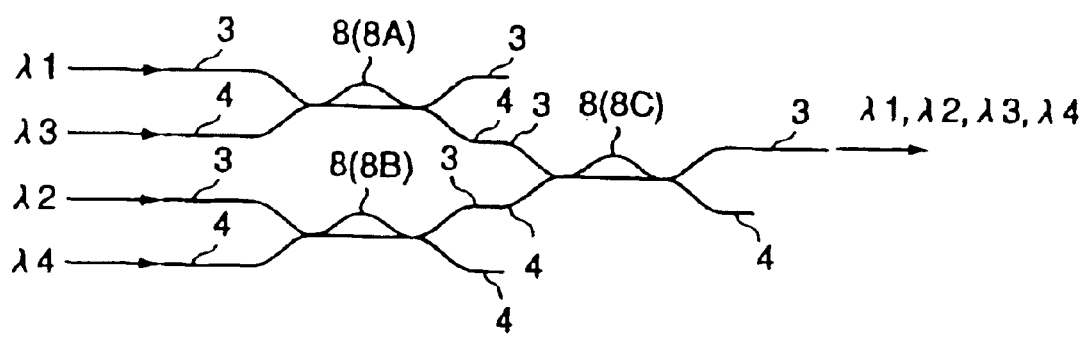
FIG. 12 is an explanatory view for explaining a circuit arrangement manufactured in such a manner that plural stages of Mach-Zehnder optical interferometer type optical multiplexing/demultiplexing circuits are connected to each other.

In FIG. 12, the respective wavelengths were selected as follows: λ1=1551.7 nm; λ2=1554.9 nm; λ3=1558.2 nm; and λ4=1561.4 nm. Then, the following operation was considered. That is, the plural sets of lights having these wavelengths are multiplexed with each other by the optical multiplexer/demultiplexer shown in FIG. 12, and then, the multiplexed light was outputted from the first optical wave guide 3 of the second stage of the optical multiplexing/demultiplexing circuit 8 (8C). In this case, when such wavelengths at which the coupling efficiencies of the directional coupling portions 1 and 2 for constituting the optical multiplexing/demultiplexing circuit 8 (8C) become 50% are selected to be the above-described four wavelengths, measurements were carried out to find maximum values of optical transmission losses.

Figure 4B:
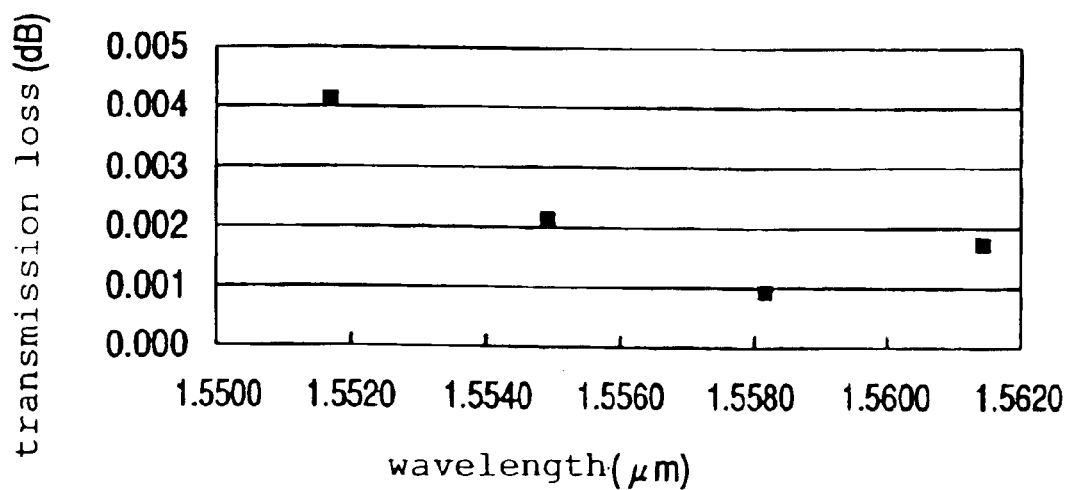
FIG. 4B is a graph for graphically showing a transmission loss of the optical multiplexer/demultiplexer when a wavelength is changed, assuming now that a coupling efficiency of directional coupling portions is set to 50%.

As a result, as indicated in FIG. 4B, the following fact could be revealed. That is, where the coupling efficiencies of the directional coupling portions 1 and 2 of the optical multiplexing/demultiplexing circuit 8 (8C) with respect to such a wavelength in the vicinity of the wavelength of 1558.2 nm is selected to be 50%, the optical transmission loss of the optical multiplexer/demultiplexer shown in FIG. 12 could be minimized. The wavelength of 1558.2 nm is equal to an averaged wavelength between the wavelengths of λ2 (1554.9 nm) and λ4 (1561.4 nm), which correspond to the cross transmission wavelength of the optical multiplexing/demultiplexing circuit 8 (8C).

As apparent from this consideration result, the Inventors could consider the following fact. That is, in the case that there are plural sets of the cross transmission wavelengths propagated through the optical multiplexing/demultiplexing circuits 8, where the coupling efficiencies of the directional coupling portions 1 and 2 of the optical multiplexing/demultiplexing circuits 8 with respect to the averaged wavelength of these plural wavelengths are approximated to 50%, the transmission losses of the light having the respective wavelengths which propagate through the optical multiplexing/demultiplexing circuits 8 can be reduced.

Furthermore, the Inventors have investigated coupling portion lengths of the directional coupling portions every wavelength, which are required to set the coupling efficiencies of both the first and second directional coupling portions 1 and 2 of the Mach-Zehnder interferometer type optical multiplexing/demultiplexing circuit 8 to setting values. The resultant coupling portion lengths were obtained as shown in FIG. 5.

It should also be noted that this investigation was carried out under such conditions that a relative diffractive index difference "Δ" of the optical multiplexing/demultiplexing circuit 8 is selected to be 0.4%, and also, pitches "$P_1$" and "$P_2$" (see FIG. 9) of the first and second directional coupling portions 1 and 2 are selected to be 12.5 micrometers. This pitch corresponds to a distance between a center of the first optical waveguide 3 and a center of the second optical waveguide 4, which is located in the vicinity of the first optical waveguide 3.

Figure 5:
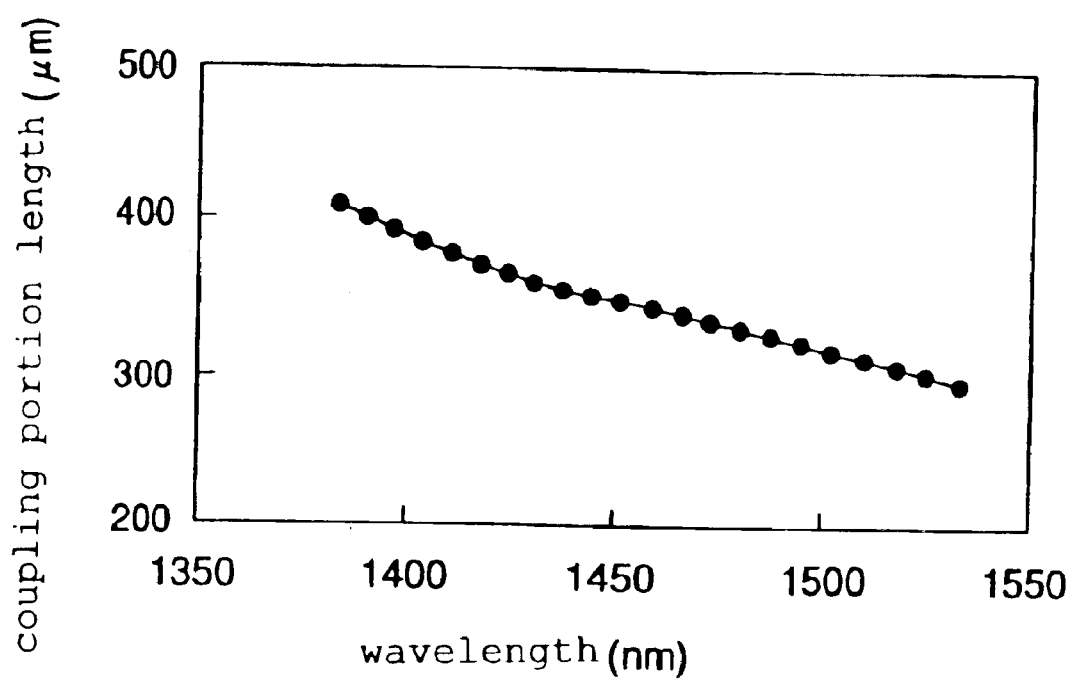
FIG. 5 is a graph for graphically indicating a coupling length of the directional coupling portions required to set a coupling efficiency with respect to a wavelength to 50%.

As indicated in FIG. 5, in the case that the wavelength is changed within a range indicated in an abscissa of this drawing, the following fact could be revealed. That is, the closer the setting wavelength is located on the long wavelength side, the shorter the coupling portion length may be reduced, which is required to set the coupling efficiencies of the first and second directional coupling portions 1 and 2 with respect to the respective wavelengths to 50% (η=0.5). In other words, as to the important structure capable of shortening the coupling portion length, the following fact could be revealed that the cross transmission wavelength which passes through the cross transmission path may be set to the wavelength located on the long wavelength side.

As previously explained, in order to reduce the transmission loss of the optical multiplexing/demultiplexing circuit 8, it is desirable to set the coupling efficiencies of the first and second directional coupling portions 1 and 2 with respect to the cross transmission wavelengths to approximately 50%. To this end, in each stage of the optical multiplexing/demultiplexing circuit, if the cross transmission wavelength (averaged wavelength when plural cross transmission wavelengths are employed) among the through transmission wavelength and the cross transmission wavelength is selected to be the wavelength located on the long wavelength side, then the transmission losses of the respective stages of the optical multiplexing/demultiplexing circuits can be reduced, and the lengths of both the first and second directional coupling portions 1 and 2 can be made short, so that the lengths of the respective stages of the optical multiplexing/demultiplexing circuits can be made short.

It should also be noted that the present invention is not limited to such a condition that the coupling efficiencies of both the first and second directional coupling portions 1 and 2 are set to approximately 50% with respect to the cross transmission wavelengths of the respective stages of the optical multiplexing/demultiplexing circuits. However, if the coupling efficiencies of both the first and second directional coupling portions 1 and 2 are set to approximately 50% with respect to the cross transmission wavelengths of the respective stages of the optical multiplexing/demultiplexing circuits, then the lower transmission loss can be achieved.

Although not shown in FIG. 5, the coupling portion length which is required to set the coupling efficiencies of the first and second directional coupling portions 1 and 2 with respect to the respective wavelengths to the setting values may be made short if the setting wavelength is located on the long wavelength side even when the setting value of the above-explained coupling efficiencies is selected to be any value other than 50%.

As a consequence, the lengths of both the first directional coupling portion 1 and the second directional coupling portion 2 of the respective stages of the optical multiplexing/demultiplexing circuits may be preferably determined, while the coupling efficiencies of the first and second directional coupling portions 1 and 2 are employed as the reference with respect to the cross transmission wavelength. As a result, both the low transmission loss and the compactness of the optical multiplexer/demultiplexer can be achieved. Also, in this case, such a structure may be preferably employed by which the lengths of the first and second directional coupling portions 1 and 2 are determined in such a way that the coupling efficiencies with respect to the averaged wavelength of the cross transmission wavelengths could be made approximated to 50%.

Then, if the coupling efficiencies of the first and second directional coupling portions 1 and 2 are determined with respect to the averaged wavelength of the cross transmission wavelengths, then the light can be multiplexed/demultiplexed in the low transmission loss by the respective stages of the optical multiplexing/demultiplexing circuits 8, and furthermore, the lengths of the respective stages of the optical multiplexing/demultiplexing circuits 8 can be shortened.

In other words, since the averaged wavelength of the cross transmission wavelengths is made longer than the averaged wavelength of the through transmission wavelengths in the respective stages of the optical multiplexing/demultiplexing circuits which constitute the optical multiplexer/demultiplexer according to the present invention, the lengths of the respective stages of the optical multiplexing/demultiplexing circuits can be shortened, while reducing the transmission losses of the respective stages of the optical multiplexing/demultiplexing circuits. As a result, the optical multiplexer/demultiplexer can be made compact.

It should also be noted that, for example, the frequencies of 212.5 THz to 198.5 THz are equal to wavelengths of 1410.8 nm to 1510.4 nm, and a wavelengths range of approximately 100 nm is involved in the wavelength range shown in FIG. 5. Now, the following case is considered. That is, while the above-explained wavelength range is used as a Raman amplification wavelength range, 16 waves of light with an interval of 1 THz are multiplexed with each other by four stages of optical multiplexing/demultiplexing circuits 8. As a result, as represented in FIG. 5, a difference between a maximum value and a minimum value of the coupling portion lengths of the directional coupling portions 1 and 2 employed in the respective stages of the optical multiplexing/demultiplexing circuits 8 is nearly equal to 65 micrometers. As a result, in the optical multiplexer/demultiplexer which is formed by connecting the four stages of the optical multiplexing/demultiplexing circuits 8, a difference of 520 micrometers is produced which is approximately 4 times larger than the above-described difference, depending upon a design manner.

Furthermore, the Inventors have paid their attentions to such a fact that the coupling efficiencies of the directional coupling portions which constitute the respective stages of the optical multiplexing/demultiplexing circuits are changed in a periodic manner with respect to the coupling portion lengths. In this drawing, the coupling efficiency is indicated by the value of "$\eta$."

In a directional coupling portion, such a relationship defined in the following formula (8) can be established among a complete coupling portion length "Lc" thereof, lead portions coupling length "Le", a coupling portion length "$L_R$" of the directional coupling portion, and symbol "$\eta$" indicative of a coupling efficiency:

$$\eta = \sin^2\{(\pi/2) \cdot (Le + L_R)/Lc\} \qquad \text{(Formula 8)}$$

It should be noted that the complete coupling portion length "Lc" corresponds to a length to realize that the coupling efficiency is equal to 100% (namely, $\eta$=1).

Figure 8:
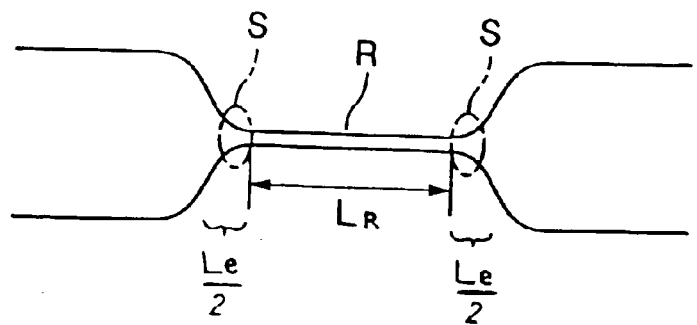
FIG. 8 is an explanatory view for explaining a coupling portion length and a lead portion coupling length of the directional coupling portions.

It should be noted that the lead portion coupling length corresponds to such a value which is obtained by converting couplings other than the coupling portion into a coupling length. The coupling portion length "$L_R$" corresponds to a length of a region indicated as "R" in FIG. 8. Also, such a value obtained by converting a coupling applying portion of light in a region indicated as "S" of FIG. 8 into a coupling length is equal to the above-described lead portion coupling length "Le." As shown in FIG. 8, the coupling efficiency "$\eta$" is expressed by the periodical function of the coupling portion length "$L_R$", whose period is equal to 2*Lc.

Figure 6:
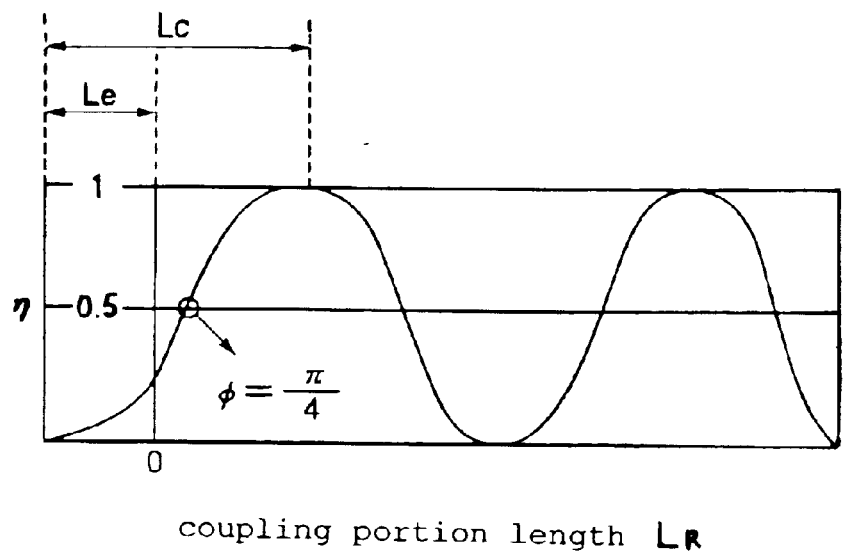
FIG. 6 is a graph for graphically indicating a relationship between the coupling portion length of the directional coupling portions and the coupling efficiency.

Also, when the relationship of the above-described formula (8) is expressed by such a relationship between a phase "$\phi$" and the coupling efficiency "$\eta$" in characteristic data of the coupling efficiency as shown in FIG. 6, the following formula (9) may be given:

$$\phi = \sin^{-1}(\eta) = (\pi/2) \cdot (Le + L_R)/Lc \qquad \text{(Formula 9)}$$

As indicated in FIG. 6, although the coupling efficiency "$\eta$" is varied in a sine wave manner with respect to the coupling portion length "$L_R$", the phase "$\phi$" is changed in a linear manner. As a result, even in different phases "$\phi$" from each other, stabilities can be directly compared with each other. As a consequence, the Inventors manufactured a plurality of optical multiplexing/demultiplexing circuits 8, and converted all of the coupling efficiency data of these plural optical multiplexing/demultiplexing circuits 8 into phase data, and also performed the analysis as to the stabilities of the directional coupling portions 1 and 2.

Figure 7:
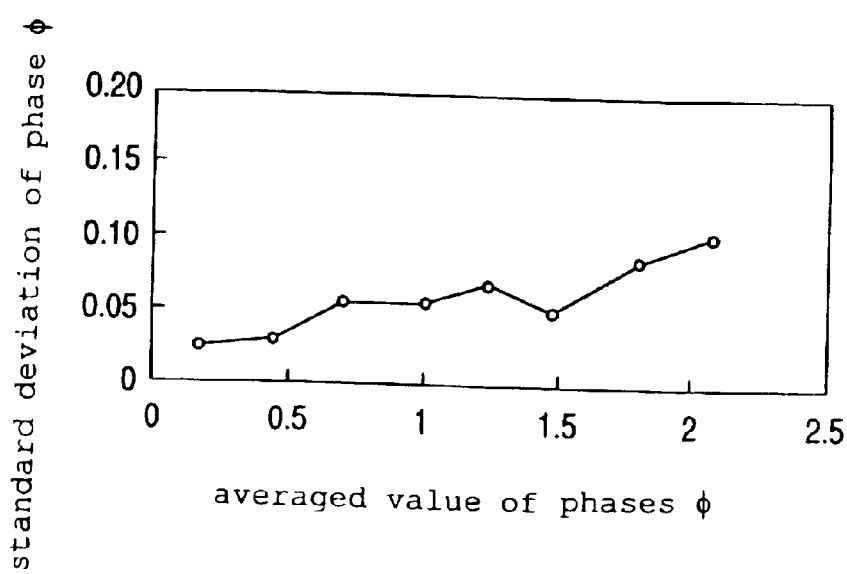
FIG. 7 is a graph for graphically representing a relationship between a phase average value of the directional coupling portions and a fluctuation.

As a result, as shown in FIG. 7, the following fact could be revealed. When the phase "$\phi$" was increased, the manufacturing functions of the phase "$\phi$" were increased, and the characteristic was deteriorated. If the phase "$\phi$" is fluctuated, then the coupling efficiency "$\phi$" is also fluctuated (coupling efficiency of directional coupling portion is fluctuated), and if the coupling efficiency is shifted from the design value, then the insertion loss is increased.

Under such a circumstance, the Inventors could conceive that when the phase "φ" is decreased, the desirable result may be obtained. Also, as apparent from the result shown in FIG. 6, a minimum value of such a phase capable of setting the coupling efficiencies of the directional coupling portions 1 and 2 to 50% ("η" can be set to 0.5) is equal to π/4. As a result the Inventor could conceive that since a value of (π/2)*(Le+L)/Lc within the above-explained formula (9) is selected to be approximately π/4 in order that the phase "φ" can become approximately π/4, the optical multiplexer/demultiplexer can be made more compact, and the insertion loss thereof can be furthermore reduced.

The optical multiplexer/demultiplexer according to the embodiment as shown in FIG. 1 has been formed based upon the above-described considerations.

As indicated in the above-explained table 1, the first stage of the optical multiplexing/demultiplexing circuit 8 (8A) sets the cross transmission wavelength λ8 (1502.7 nm) to be longer than the through transmission wavelength λ4 (1473.2 nm). Also, this optical multiplexing/demultiplexing circuit 8 (8A) sets the coupling efficiencies of the first and second direction coupling portion 1 and 2 to 50% (η=0.5) with respect to the cross transmission wavelength λ8.

Also, the first stage of the optical multiplexing/demultiplexing circuit 8 (8B) sets the cross transmission wavelength λ6 (1487,8 nm) to be longer than the through transmission wavelength λ2 (1458.8 nm). Also, this optical multiplexing/demultiplexing circuit 8 (8B) sets the coupling efficiencies of the first and second direction coupling portion 1 and 2 to 50% with respect to the cross transmission wavelength λ6.

Also, the first stage of the optical multiplexing/demultiplexing circuit 8 (8C) sets the cross transmission wavelength λ5 (1480.5 nm) to be longer than the through transmission wavelength λ1 (1451.8 nm). Also, this optical multiplexing/demultiplexing circuit 8 (8C) sets the coupling efficiencies of the first and second direction coupling portion 1 and 2 to 50% with respect to the cross transmission wavelength λ5.

Further, the first stage of the optical multiplexing/demultiplexing circuit 8 (8D) sets the cross transmission wavelength λ7 (1495.2 nm) to be longer than the through transmission wavelength λ3 (1466.0 nm). Also, this optical multiplexing/demultiplexing circuit 8 (8D) sets the coupling efficiencies of the first and second direction coupling portion 1 and 2 to 50% with respect to the cross transmission wavelength λ7.

Also, the second stage of the optical multiplexing/demultiplexing circuit 8 (8E) sets an averaged wavelength (2 λ4 λ8)/(λ4+λ8) of the cross transmission wavelengths to be longer than an averaged wavelength (2 λ2 λ6)/(λ2+λ6) of the through transmission wavelengths. This optical multiplexing/demultiplexing circuit 8 (8E) sets the coupling efficiencies of the first and second directional coupling portions 1 and 2 to 50% with respect to an averaged wavelength (2 λ4 λ8)/(λ4+λ8) of the cross transmission wavelengths.

Also, the second stage of the optical multiplexing/demultiplexing circuit 8 (8F) sets an averaged wavelength (2 λ3 λ7)/(λ3+λ7) of the cross transmission wavelengths to be longer than an averaged wavelength (2 λ1 λ5)/(λ1+λ5) of the through transmission wavelengths. This optical multiplexing/demultiplexing circuit 8 (8F) sets the coupling efficiencies of the first and second directional coupling portions 1 and 2 to 50% with respect to an averaged wavelength (2 λ3 λ7)/(λ3+λ7) of the cross transmission wavelengths.

Furthermore, the third stage of the optical multiplexing/demultiplexing circuit 8 (8G) sets an averaged wavelength (4 λ2 λ4 λ6 λ8)/(λ4 λ6 λ8+λ2 λ6 λ8+λ2 λ4 λ8+λ2 λ4 λ6) of the cross transmission wavelengths to be longer than an averaged wavelength (4 λ1 λ3 λ5 λ7)/(λ3 λ5 λ7+λ1 λ5 λ7+λ1 λ3 λ7+λ1 λ3 λ5) of the through transmission wavelengths.

This optical multiplexing/demultiplexing circuit 8 (8G) sets the coupling efficiencies of the first and second directional coupling portions 1 and 2 to 50% with respect to an averaged wavelength (4 λ2 λ4 λ6 λ8)/(λ4 λ6 λ8+λ2 λ6λλ8+λ2 λ4 λ8+λ2 λ4 λ6) of the cross transmission wavelengths.

Also, the coupling portion lengths of the first and second directional coupling portions 1 and 2 provided in the respective optical multiplexing/demultiplexing circuits 8 (8A to 8G) correspond to values listed in the table 1. These values are such minimum values by which the coupling efficiencies of the first and second directional coupling portions 1 and 2 can be set to approximately 50% with respect to the averaged wavelength of the cross transmission wavelengths corresponding to the respective stages of the optical multiplexing/demultiplexing circuits 8 (8A to 8G).

In other words, in this embodiment, assuming now that the coupling portion length of each of the directional coupling portions 1 and 2 of each of the optical multiplexing/demultiplexing circuits 8 (8A to 8G) is selected to be "L", the complete coupling length of the directional coupling portions 1 and 2 is selected to be "Lc", and further, the lead portion coupling length of the directional coupling portions 1 and 2 is selected to be "Le", (π/2)*(Le+L)/Lc is nearly equal to π/4. The length of the optical multiplexer/demultiplexer of this embodiment may become 62 mm based upon this designing idea. This length (62 mm) corresponds to such a length shorter than the length (63 mm) of the conventional optical multiplexer/demultiplexer shown in FIG. 10 by 1 mm.

An optical multiplexer/demultiplexer according to one embodiment is manufactured in accordance with the below-mentioned manner. That is, a first manufacturing step of this optical multiplexer/demultiplexer corresponds to such a step that silica-based glass is processed by the flame hydrolysis deposition method so as to form a lower cladding layer and a core layer on a silicon substrate, and both the lower cladding layer and the core layer are processed in a consolidating furnace. A second manufacturing step of the optical multiplexer/demultiplexer corresponds to such a step that while a photomask having the pattern shown in FIG. 1 is employed, a core circuit with the pattern indicated in FIG. 1 is processed by way of the photolithography technique and the dry etching technique.

A third manufacturing step of this optical multiplexer/demultiplexer corresponds to such a step that an upper cladding layer for covering the core circuit is deposited by employing the flame hydrolysis deposition method, and then, the entire portion is processed by using the consolidating furnace. Accordingly, the optical multiplexer/demultiplexer of one embodiment can be manufactured by executing the above-described first to third manufacturing steps.

It should be understood that while a diffractive index of the lower cladding was made equal to a diffractive index of the upper cladding, either $GeO_2$ or $TiO_2$ was added as a dopant to the core in order to increase a diffractive index of this core, as compared with the diffractive indexes of both the lower cladding and the upper cladding, and also, a relative diffractive index difference "Δ" was set to 0.4%.

While the optical multiplexer/demultiplexer according to one embodiment has been manufactured in accordance with the above-described method, the averaged wavelength of the cross transmission wavelengths was made longer than the averaged wavelength of the through transmission wavelengths in the respective stages of the optical multiplying/demultiplying circuits 8 (8A to 8G) which constitute this optical multiplexer/demultiplexer of this embodiment based upon the considerations made by the Inventors of the present invention.

As a consequence, the optical multiplexer/demultiplexer of the embodiment can be made compact, since the lengths of the respective stages of the optical multiplexing/demultiplexing circuits 8 (8A to 8G) can be shortened, and also, the length of this optical multiplexer/demultiplexer can be made short.

As previously explained, the length of the optical multiplexer/demultiplexer according to this embodiment is equal to 62 mm. Accordingly, as represented in FIG. 3, 18 pieces of the chips 9 which constitute the optical multiplexers/demultiplexers could be formed on a single 4-inch wafer 20. If such a conventional optical multiplexer/demultiplexer as shown in FIG. 10 is manufactured so as to multiplex the lights having the same wavelengths as those of this embodiment, then the length of this conventional optical multiplexer/demultiplexer becomes 63 mm. As a result, as represented in FIG. 11, only 17 pieces of chips 9 may be merely formed from a single wafer 20.

As previously described, a large number of optical multiplexers/demultiplexers can be formed by employing such a single wafer 20, since the length of the optical multiplexer/demultiplexer of one embodiment can be made shorter. As a result, total cost of these optical multiplexers/demultiplexers can be reduced.

Also, in accordance with the optical multiplexer/demultiplexer of this embodiment, the coupling efficiencies of the directional coupling portions 1 and 2 with respect to the averaged wavelength of the cross transmission wavelengths are selected to be approximately 50% in the respective stages of the optical multiplexing/demultiplexing circuits 8 (8A to 8G). As a consequence, as apparent from the above-described considerations of the Inventors of the present invention as indicated in FIG. 4A and FIG. 4B, such an optical multiplexer/demultiplexer capable of executing both the multiplexing operation and the demultiplexing operation in lower transmission loss can be realized.

Furthermore, in the optical multiplexer/demultiplexer of one embodiment, the value of $(\pi/2)\cdot(L_e+L_R)/L_c$ is nearly equal to $\pi/4$, while this value is determined based upon the coupling potion length "$L_R$" of the directional coupling portions 1 and 2, the complete coupling length "$L_c$" of the directional coupling portions 1 and 2, and also, the lead portion coupling length "$L_e$" of the directional coupling portions 1 and 2 employed in the respective stages of the optical multiplexing/demultiplexing circuits 8 (8A to 8G). As a result, the more compact optical multiplexer/demultiplexer with lower transmission loss can be realized in accordance with this embodiment.

Figure 2:
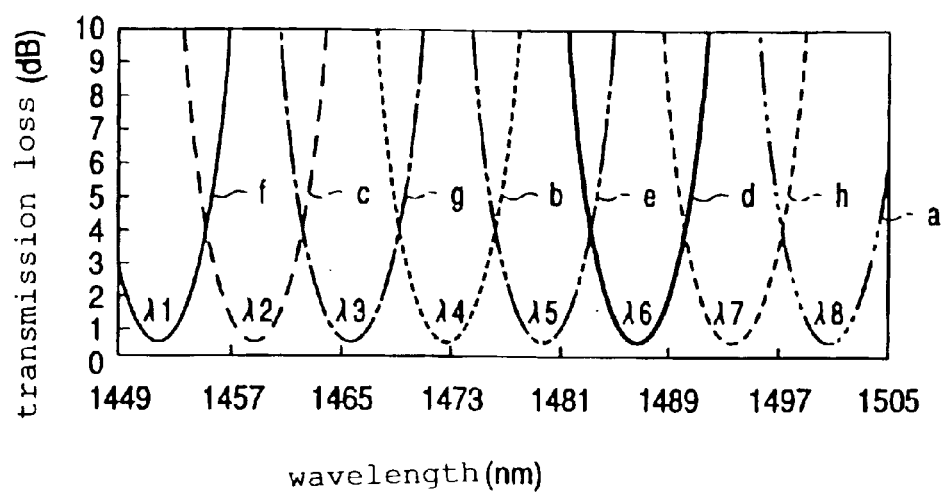
FIG. 2 is a graph for graphically indicating an optical multiplexing characteristic of the optical multiplexer/demultiplexer of this embodiment.

In FIG. 2, there is shown a multiplexing characteristic of this optical multiplexer/demultiplexer according to this embodiment. As apparent from FIG. 2, a transmission loss (peak loss) of the worst port thereof was 0.77 dB. It should be understood that if such a conventional optical multiplexer/demultiplexer having the circuit shown in FIG. 10 was manufactured so as to multiplex the light having the same wavelengths as those of this embodiment, then a transmission loss (peak loss) of the worst port thereof was 0.9 dB. As a result, the following fact could be confirmed. That is, in accordance with the optical multiplexer/demultiplexer of one embodiment, the transmission loss thereof could be reduced, as compared with that of the conventionally proposed optical multiplexer/demultiplexer.

It should also be understood that the present invention is not limited only to the above-explained embodiment, but may be realized by employing various modes of embodiments. For instance in the optical multiplexer/demultiplexer of the present invention, a total connecting stage number of the above-described optical multiplexing/demultiplexing circuits 8 is not specifically limited to the above-described stage numbers, but may be properly selected. Alternatively, in accordance with the optical multiplexer/demultiplexer of the present invention, two stages of the optical multiplexing/demultiplexing circuits 8 may be connected to each other in a tree shape. Also, four, or more stages of the optical multiplexing/demultiplexing circuits 8 may be connected to each other in a tree shape.

Also, the wavelengths of the light which is multiplexed/demultiplexed by the optical multiplexer/demultiplexer of the present invention are not specifically limited to the above-described wavelengths, but may be properly set. In this alternative case, an averaged wavelength of cross transmission wavelengths may be merely made longer than an averaged wavelength of through transmission wavelengths in the respective stages of the optical multiplexing/demultiplexing circuits 8.

In addition, such an example that the wavelength-multiplexed light is multiplexed by the optical multiplexer/demultiplexer has been exemplified in the above-described example. Alternatively, the optical multiplexer/demultiplexer of the present invention may also be applied to such a wavelength multiplexer/demultiplexer capable of demultiplexing light having a plurality of wavelengths.

What is claimed is:

1. An optical multiplexer/demultiplexer comprising:
    a plurality of Mach-Zehnder optical interferometer multiplexing/demultiplexing circuits connected in plural stages, at least one of said plurality of Mach-Zehnder optical interferometer multiplexing/demultiplexing circuits including:
        a first optical waveguide,
        a second optical waveguide disposed along said first optical waveguide,
        a first directional coupling portion that connects a first part of said first optical waveguide to a first part of said second optical waveguide, and
        a second directional coupling portion that connects a second part of said first optical waveguide to a second part of said second optical waveguide;
    a length of said first optical waveguide between said first and second directional coupling portions is larger than a length of said second optical waveguide between said first and second directional coupling portions; and
    said at least one of the plurality of Mach-Zehnder optical interferometer circuits is configured to set an average wavelength of cross transmission wavelengths of an input WDM optical signal larger than an average wavelength of through transmission wavelengths of the WDM optical signal, wherein
    a cross transmission wavelength is defined as being at least one of (i) a wavelength which is inputted from a light incident side of said first optical waveguide and outputted from a light projection side of said second optical waveguide, and (ii) a wavelength which is inputted from a light incident side of said second optical waveguide and outputted from a light projection side of said first optical waveguide, a through transmission wavelength is defined as being at least one of (i) a wavelength inputted from the light incident side of said first optical waveguide and outputted from the light projection side of said first optical waveguide, and (ii) a wavelength inputted from the light incident side of said second optical waveguide and outputted from the light projection side of said second optical waveguide, and a relationship among a coupling portion length $L_R$ of at least one of said first and second directional coupling portions, a complete coupling length $L_C$ of at least one of said first and second directional coupling portions and a lead portion coupling length $L_c$ of at least one of said first and second directional coupling portions, is substantially:

$$\frac{\pi}{2} \times \frac{L_e + L_R}{L_C} = \frac{\pi}{4}.$$

2. An optical multiplexer/demultiplexer according to claim 1, wherein:
   a coupling efficiency of said first directional coupling portion of at least one of said plurality of multiplexing/demultiplexing circuits is equal to a coupling efficiency of said second directional coupling portion of said at least one of said plurality of multiplexing/demultiplexing circuits.

3. An optical multiplexer/demultiplexer according to claim 2, wherein:
   the coupling efficiencies of said first and second directional coupling portions are approximately 50% with respect to the average wavelength of the cross transmission wavelengths corresponding to said at least one of said plurality of multiplexing/de-multiplexing circuits.

4. An optical multiplexer/demultiplexer according to claim 3, wherein:
   the coupling efficiencies of said first and second directional coupling portions are equal at each stage of said plural stages of said optical multiplexer/demultiplexer.

5. An optical multiplexer/demultiplexer according to claim 2, wherein:
   the coupling efficiencies of said first and second directional coupling portions at each stage of said optical multiplexer/demultiplexer are selected to be approximately 50% with respect to the average wavelength of the cross transmission wavelengths corresponding to each stage of said plural stages of said optical multiplexer/demultiplexer.

6. An optical multiplexer/demultiplexer according to claim 2, wherein:
   the coupling efficiencies of said first and second directional coupling portions are approximately 50% with respect to the average wavelength of the through transmission wavelengths corresponding to said at least one of said plurality of multiplexing/demultiplexing circuits.

7. An optical multiplexer/demultiplexer according to claim 6, wherein:
   the coupling efficiencies of said first and second directional coupling portions at each stage of said plural stages of said optical multiplexer/demultiplexer are selected to be approximately 50% with respect to the average wavelength of the through transmission wavelengths corresponding to each stage of said plural stages of said optical multiplexer/demultiplexer.

8. An optical multiplexer/demultiplexer according to claim 1, wherein:
   a length of said first and second directional coupling portions of at least one of said plurality of multiplexing/demultiplexing circuits is selected according to a largest wavelength which is inputted into said at least one of said plurality of multiplexing/demultiplexing circuits.

9. An optical multiplexer/demultiplexer according to claim 1, wherein:
   a distance between the first and second optical waveguides in said first directional coupling portion and a distance between the first and second optical waveguides in said second directional coupling portion, at each stage of said plural stages, are selected to be in the range of 10–15 $\mu$m.

10. An optical multiplexer/demultiplexer according to claim 1, wherein:
    a relative diffractive index difference between a core and a buffer of said first and second optical waveguides of the optical multiplexing/demultiplexing circuits is selected to be in the range of 0.3–1.5%.

11. An optical multiplexer/demultiplexer comprising:
    a plurality of Mach-Zehnder optical interferometer multiplexing/demultiplexing circuits connected in plural stages, at least one of said plurality of Mach-Zehnder optical interferometer multiplexing/demultiplexing circuits including:
    a first optical waveguide,
    a second optical waveguide disposed along said first optical waveguide,
    first directional coupling means for connecting a first part of said first optical waveguide to a first part of said second optical waveguide,
    second directional coupling means for connecting a second part of said first optical waveguide to a second part of said second optical waveguide, a length of said first optical waveguide between the first and second directional coupling means is larger than a length of said second optical waveguide between the first and second directional coupling means; and
    means for setting an average wavelength of cross transmission wavelengths of an input WDM optical signal larger than an average wavelength of through transmission wavelengths of the WDM optical signal, wherein
    a cross transmission wavelength is defined as being at least one of (i) a wavelength which is inputted from a light incident side of said first optical waveguide and outputted from a light projection side of said second optical waveguide, and (ii) a wavelength which is inputted from a light incident side of said second optical waveguide and outputted from a light projection side of said first optical waveguide,
    a through transmission wavelength is defined as being at least one of (i) a wavelength inputted from the light incident side of said first optical waveguide and outputted from the light projection side of said first optical waveguide, and (ii) a wavelength inputted from the light incident side of said second optical waveguide and outputted from the light projection side of said second optical waveguide, and
    a relationship among a coupling portion length $L_R$ of at least one of said first and second directional coupling portions, a complete coupling length $L_C$ of at least one of said first and second directional coupling portions and a lead portion coupling length $L_c$ of at least one of said first and second directional coupling portions, is substantially:

$$\frac{\pi}{2} \times \frac{L_e + L_R}{L_C} = \frac{\pi}{4}.$$

12. An optical multiplexer/demultiplexer according to claim 11, wherein:
a coupling efficiency of the first directional coupling means of at least one of said plurality of multiplexing/demultiplexing circuits is equal to a coupling efficiency of the second directional coupling means of said at least one of said plurality of multiplexing/demultiplexing circuits.

13. An optical multiplexer/demultiplexer according to claim 12, wherein:
the coupling efficiencies of the first and second directional coupling means are approximately 50% with respect to the average wavelength of the cross transmission wavelengths corresponding to said at least one of said plurality of multiplexing/demultiplexing circuits.

14. An optical multiplexer/demultiplexer according to claim 13, wherein:
the coupling efficiencies of the first and second directional coupling means are equal at each stage of said plural stages of said optical multiplexer/demultiplexer.

15. An optical multiplexer/demultiplexer according to claim 12, wherein:
the coupling efficiencies of the first and second directional coupling means at each stage of said plural stages of said optical multiplexer/demultiplexer are selected to be approximately 50% with respect to the average wavelength of the cross transmission wavelengths corresponding to each stage of said plural stages of said optical multiplexer/demultiplexer.

16. An optical multiplexer/demultiplexer according to claim 12, wherein:
the coupling efficiencies of the first and second directional coupling means are approximately 50% with respect to the average wavelength of the through transmission wavelengths corresponding to said at least one of said plurality of multiplexing/demultiplexing circuits.

17. An optical multiplexer/demultiplexer according to claim 16, wherein:
the coupling efficiencies of the first and second directional coupling means at each stage of said plural stages of said optical multiplexer/demultiplexer are selected to be approximately 50% with respect to the average wavelength of the through transmission wavelengths corresponding to each stage of said plural stages of said optical multiplexer/demultiplexer.

18. An optical multiplexer/demultiplexer according to claim 11, wherein:
a relative diffractive index difference between a core and a buffer of said first and second optical waveguides of the optical multiplexing/demultiplexing circuits is selected to be in the range of 0.3–1.5%.

* * * * *